June 25, 1968  E. J. HERBENAR  3,389,927
JOINT ASSEMBLY
Filed Sept. 21, 1965
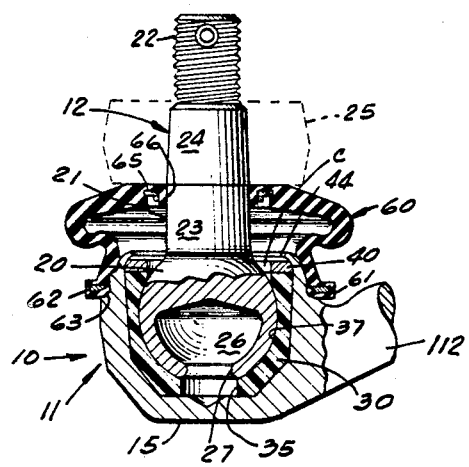
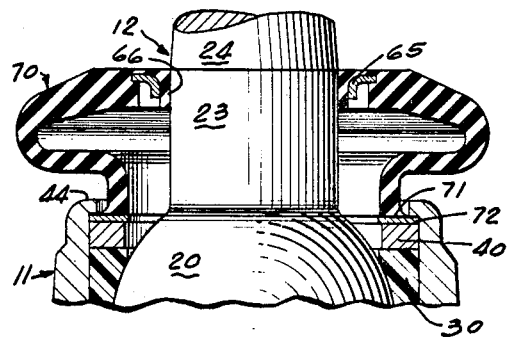
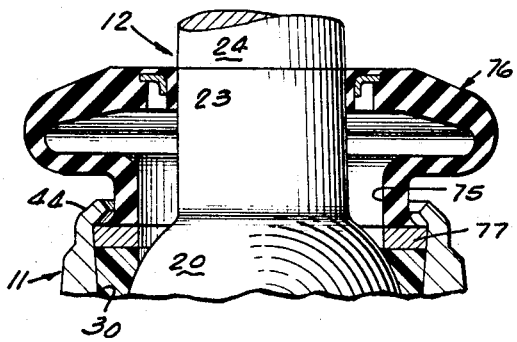
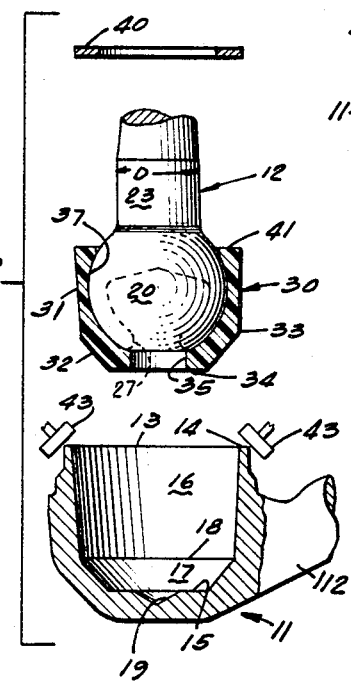
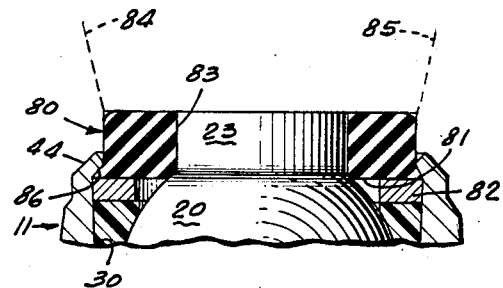
INVENTOR.
EDWARD J. HERBENAR
BY _Hill, Sherman, Meroni, Gross & Simpson_ ATTORNEYS

United States Patent Office 3,389,927
Patented June 25, 1968

3,389,927
JOINT ASSEMBLY
Edward J. Herbenar, Detroit, Mich., assignor to TRW Inc., Cleveland, Ohio, a corporation of Ohio
Filed Sept. 21, 1965, Ser. No. 488,968
2 Claims. (Cl. 287—87)

ABSTRACT OF THE DISCLOSURE

A pivotal joint assembly including a socket having a closed end and an open end and having a pair of frusto-conical surfaces of different taper toward the closed end, a stud having its ball end within said socket and its shank end extending through an open end of such socket, the ball end preferably being hollow and open toward the closed end of the socket, and a bearing member of anti-frictional deformable material between said ball end and said socket so arranged and constructed as to be in press-fit relationship with both when the assembly is completed and the bearing member is placed under axial load.

*Brief summary of the invention*

The reverse socket pivot type ball joint of this invention includes a socket housing having an open end and a closed end, the inner surface of the housing comprising a pair of frusto-conical surfaces of different degrees of taper toward the closed end of the housing. A ball stud is mounted with its ball end within the housing and its shank end extending through the open end of the housing. Preferably, the ball end is hollow and opens toward the closed end of the housing. In the assembly, a preformed one-piece bearing member of deformable plastic material, having inner and outer surfaces of generally corresponding conformation to the outer surface of the ball end and to the inner surface of the socket housing, respectively, is placed under endwise, or axially applied, load so as to be in press-fit relationship between said ball and said inner housing surface. The turning torque necessary to provide full pivotal movement of the ball stud relative to the socket varies through such a relatively small range that the turning movement is substantially uniform at all times for a given applied torque.

This invention relates to a joint assembly and more particularly to ball joints of the reverse socket pivot type for use in automotive steering linkages, wheel suspensions and other jointed linkage systems.

One of the features of my present invention is the provision of a socket housing formed of rigid material, such as metal, having an inner wall surface that is convergent from the initially open end of the socket toward the closed end of the socket. This permits all of the machining operations to be performed from the side of the larger open end of the socket wtih a minimum number of dimensional manufacturing variables. It also makes for easier assembly operations. Additionally, by forming the socket housing integrally with a stem, a deeper section stem, resulting in a stronger part and a more efficient use of material can be employed without interfering with the assembly of the joint and with greater adaptability in the use of the joint assembly to locations where space available for the joint assembly is limited.

Another feature of my joint assembly is the provision of a preformed, one-piece bearing member of polyethylene material having high tensile strength and high stiffness modulus but capable of deformation under pressure so that it can be pre-loaded. The bearing member is preformed so that its outer surface has substantially the same conformation and contours as those of the inner socket wall of the housing, while the inner surface of the bearing is of segmental spherical conformation to accommodate the ball end of the stud. When the bearing member is placed under load, which can be accomplished by turning in the periphery about the open end of the socket, the bearing member, because of its good anti-frictional properties and the uniformity of the pressure that it exerts radially over the surface of the ball head of the stud, insures a substantially uniform turning torque requirement for satisfactory operation of the joint assembly. This means that through the full pivotal movement of the ball stud relative to the socket the turning torque required varies only through a relatively small range, such that the turning movement is substantially uniform at all times for a given applied turning torque. This holds true even though there may be a relatively large variation in the amount of preload to which the bearing member is subjected as the result of its press-fit type of assembly and the subsequent turning in of the socket housing margin about the open end of the socket.

It is, then, an object of this invention to provide a pivotal ball joint assembly that is economical to manufacture and that has a relatively constant turning torque in use throughout its intended life term.

It is a further object of this invention to provide a pivotal ball joint assembly that includes a preformed, pre-lubricated bearing member of a polyethylene material having good anti-friction and elastomeric properties, such that it can be press-fitted into a housing socket about the ball end of a stud to completely fill the socket cavity and provide intimate contact with the surface of the ball end, and can be preloaded to the extent required to insure a uniformly smooth operation of the joint assembly in use despite relatively large variations of the press-in load or the load resulting from the turning-in of the housing margin about its open end.

It is a further important object of this invention to provide a ball joint assembly of such construction and arrangement as to permit the use of the assembly in areas heretofore not possible with previous constructions of ball joint assemblies.

It is a further important object of this invention to provide a ball joint assembly in which the bearing member is made from a polyethylene material of high-density, high tensile strength and a high stiffness modulus, yet having elastomeric properties such that the bearing member contributes to vibration damping in the system that includes the ball joint assembly.

It is a further important object of this invention to provide a ball joint assembly that is extremely durable under both impact and static loading and that is unusually safe from the standpoint of possible failure in use.

Other and further objects of this invention become apparent to those skilled in this art from the annexed sheet of drawings, which, by way of a preferred embodiment only, illustrate one example of this invention.

On the drawings:

FIG. 1 is a vertical cross-sectional view, with parts in elevation and parts shown in dotted lines, of a ball-and-socket joint embodying the principles of my invention.

FIG. 2 is an exploded view of the ball-and-socket joint of FIG. 1, illustrating the method of assembly.

FIG. 3 is an enlarged fragmentary, vertical sectional view, with parts in elevation, of the assembly of FIG. 1, but with a modified form of boot seal.

FIG. 4 is a view similar to FIG. 3 with a still further modification of boot seal.

FIG. 5 is a view similar to FIGS. 3 and 4 with a still further modification of seal.

As shown on the drawings:

The reference numeral 10 indicates generally a balland-socket joint of what has been termed the "reverse socket pivot joint" hereinabove. The term is used to distinguish from the more conventional type of ball-and-socket joint assembly in which the socket housing has an enlarged opening at one end with the inner socket wall tapered toward the other restricted end of the housing, wherein assembly is effected by inserting the bearing member, or members, and the ball stud through the larger open end and thereafter turning over the margin of the lower open end of the housing against a closure member to complete the assembly. In the reverse socket type of joint, such as that shown here, the socket housing is closed at one end and open at the other and the bearing member, or members, and ball stud are inserted through the open end into position within the socket and the housing margin about the open end then turned in to retain the ball stud and bearing member, or members, in assembled relationship. As will be more fully explained hereinafter, the present reverse socket pivot joint construction embodies certain novel features over heretofore known structures of this general type.

Said assembly 10 includes a socket housing 11, preferably formed of metal, or other strong and rigid material, and a ball stud 12, also of metal. The housing 11 is preferably formed integrally with a solid stem 112 extending from one side thereof for connection to a linkage member, such as a tie rod, or other link or arm member. Said housing 11 is provided with a socket 13 that is of greater diameter at its upper end 14 than its closed end 15. The surface of the socket 13 is preferably formed in two parts, a major part 16 extending from the open end 14 to a depth indicated by the line 18 and being constituted by a frusto-conical surface of slight convergency toward said closed end 15. The minor portion 17 extending beyond the line 18 to the closed end 15 is also frusto-conical in countour but of greater taper inwardly toward said closed end. In its initial form (FIG. 2) the major portion surface 16 is of continuous frusto-conical form toward the open end 14 and is not provided with a counter-bore. Thus, all of the machining operations necessary to form the inner surfaces 16 and 17 of the socket housing 11 can be carried out through the open end 14 of the socket 13, i.e., wholly from one side of the socket housing. The indentation 19 shown in the bottom 15 of the socket as axially thereof serves merely as a pilot for the machining tools to insure concentricity of the major and minor frusto-conical surfaces 16 and 17. The degree of taper of said surfaces 16 and 17 is not critical but should be sufficient to permit all of the machining operations to be carried out from the one side, viz., the open side of the housing.

The ball stud 12, as is customary, comprises a ball end 20, a shank 21 and a threaded end 22 thereon. Said shank 21 has a straight cylindrical portion 23 of a diameter D which is substantially less than the diameter of the open end 14 of the housing 11. Beyond the cylindrical shank portion 23 there is a shank portion 24 that is frusto-conical and that tapers down to substantially the diameter of the cylindrical threaded portion 22. Said tapered portion 24 is adapted to be wedge-fitted in the eye of steering linkage or the like, while the threaded end 22 is adapted to receive a nut for drawing the tapered portion of the shank into wedge fit with the eye of the linkage, the latter being indicated in dotted lines by the reference numeral 25.

The ball stud 12, however, differs from conventional ball studs in that the ball end 20 is formed with a hollow, or recess 26, with a constricted opening 27 through the wall of the ball axially thereof and opposite the shank end of the stud. This construction of ball stud and hollow ball end results from the method of making the same by cold heading of the metal. This method not only produces a better flow of metal and better grain direction with more efficient control of size of ball end than conventional methods, but reduces the weight of metal in the ball stud and also provides a recess, such as the recess 26, for the storage of lubricant.

Prior to the insertion of the ball stud into the socket housing, as shown in FIG. 2, a bearing member 30 is mounted upon the ball end 20 of the ball stud 12. Said bearing member 30 is preferably formed of a polyolefin material, and suitably of an ethylene-butene copolymer resin or of a polymer of ethylene. An example of a particularly suitable ethylene-butene copolymer resin is that known as "Marlex," a proprietary product of Phillips Chemical Company, especially the resins designated as "5002" and "5003." These resins are believed to be high-density copolymers of ethylene and butene or other alpha-olefin. In the density range of 0.941 to 0.965 the degree of chain branching varies from moderate branching for a polymer of 0.941 density to a strictly linear resin, free of branching, of 0.965 density. Polymers found suitable for my invention have a density of 0.93 to 0.96, a tensile strength of up to 6000 p.s.i.; an elongation of up to 1200%; and a stiffness modulus of up to 150,000 p.s.i. Other suitable polyethylene resins that are available include "Alathon," such as No. 7622, a proprietary product of the du Pont Company, and "Forti-flex" B–50–20R, a proprietary product of Celanese Plastics Company. All of these polyethylene resins, in addition to having good anti-frictional properties, have "rubber-like," or elastomeric properties, such that they can be deformed under pressure to transmit the pressure load to surfaces to which the resin is in contact. At the same time, the polyethylene material has sufficient strength and rigidity, when used as the bearing material in a joint assembly, to prevent the stud from being pulled out of the assembly under the action of any forces that are likely to be set up in use of the assembly.

The bearing 30 is preferably a one-piece, preformed bearing member having an outer surface conformation similar to that of the inner wall of the socket housing. Said outer surface of the bearing member 30 thus includes a major frusto-conical surface 31 of only slight taper, and a minor frusto-conical surface 32 of considerably greater taper, extending from the tapered surface 30 to the very end 34 of the bearing member. Said end 34 is provided with a cylindrical aperture 35 therethrough, axially of the bearing member and preferably of somewhat greater diameter than that of the opening 27 into the recess 26 in the ball end 20. The inner surface 37 of said bearing member 30 is segmental spherical, formed with substantially the same radius of curvature as that of the outer segmental spherical surface of the ball end 20 and, therefore, adapted to snugly receive said ball end when the same is inserted into the interior of the bearing member 30.

In assembling the ball stud in the socket housing 11, the ball end 20 of the ball stud 12 is first inserted into the bearing member 30 to the fullest extent possible, the elastic character of the material of the bearing member 30 permitting the amount of stretching of the neck of the bearing member necessary to effect such insertion. With the bearing member 30 snugly engaged about the ball end 20 of the ball stud 12, as shown in FIG. 2, the ball stud and bearing member are then force-fitted into the socket 13 of the housing 11. The degree of force used in effecting such press-fit is sufficient to provide complete filling of the socket cavity and intimate surface contact between the segmental spherical surface of the ball end 20 and the surface 37 of the bearing member 30. Additionally, the press-fit results in a substantial residual compression of the material of the bearing memebr 30.

In the next step of assembly, a ring 40, best shown in FIG. 2, is slipped over the threaded end of the ball stud 12 to abut against the upper end surface 41 of the bearing member 30. Thereafter, the upper marginal edge 14 of the housing 11 is turned or rolled inwardly, as by means of a spinning tool 43, to form an annular inturned shoulder 44 (FIG. 1). In the act of rolling in the shoulder 44, the shoulder so formed is caused to extend radially inwardly and overlie the ring 40 and exert a loading force thereagainst that is transmitted through the bearing member 30 to the upper end 41 thereof. The resulting loading pressure, superimposed upon that effected by the previous press-fit step, makes possible any degree of preloading that may be required or desired. Since the major wall surface 16 is free of any counter-bore step, the ring 40 can slide freely into the bore to whatever depth is required to provide the necessary preload on the bearing assembly as a result of the turning or rolling over of the inturned flange 44. At the same time, the intimate contact of the ring 40 with the wall surface 16 and with said inturned flange 44 provides excellent resistance to any pullout of the stud after assembly.

Lubrication of the relatively moving surfaces between the bearing member 30 and the ball end 20 of the stud 12 can be provided for in advance of the final assembly of the joint. This is best accomplished by pre-greasing the inner segmental spherical surface 37 of the bearing member 30, and then pressing the ball end 20 into the bearing member. Additionally, as indicated above, the recess 26 in the ball end 20 can be filled with grease, or other lubricant, prior to final aseembly in the socket housing 11.

In its final assembled state, the ball stud 12 of the assembly is free to rotate or pivot relatively to the socket housing 11, and also has a limited degree of freedom to oscillate due to the clearance C between the cylindrical portion 23 of the ball stud and the ring 40 and inturned flange 44. The diameter D of said cylindrical portion 23 is considerably less than the internal diameter of either the ring 40 or the inturned flange 44 to provide whatever amount of clearance for this purpose may be required.

In order to seal the joint assembly against the ingress of foreign matter, dust, and the like, a boot seal, indicated generally by the reference numeral 60 (FIG. 1), is provided. Said boot seal 60, as illustrated in FIG. 1, is of the external type, being provided with a snap-fitting neck portion 61, reinforced by an inner ring 62 of metal, or the like, bonded therein, for snapping into a shallow annular groove 63 in the upper outer surface of the socket housing 11. There is sufficient springiness to the ring-reinforced neck portion 61 of the boot seal 60 to permit said neck portion 61 of the boot seal 60 to permit said neck portion to be snapped into place within the shallow groove 63 and to be retained therein in snug engagement therewith. Said boot seal 60 is suitably formed or rubber or other elastomeric material and is sufficiently thin-walled to permit flexing under the compressive force of the eye 25 as the latter is forced down over the frusto-conical surface 24 of the shank 12. Additionally, the boot seal 60 is provided with an imbedded spring-ring 65 inwardly of and adjacent to the smaller opening 66 through which the shank 12 extends. The dimensions are such that the boot seal 60 snugly engages the cylindrical portion 23 of the shank to effect a seal between said cylindrical surface and the inner surface of the opening 66 when the boot seal is in its final assembled relationship, as illustrated in FIG. 1.

Instead of an external type of boot seal, any of the internal types of boot seal illustrated in FIGS. 3, 4 or 5 can be employed. In FIG. 3, the boot seal 70 is provided with an annular, open neck portion 71, the end surface of which is bonded to a ring plug 72. Prior to the rolling in of the flange 44, the ring plug 72 is placed in abutting relationship against the upper surface of the ring 40. The flange 44 is thereafter formed to overlie and exert pressure against the ring plug 72, and through the ring 40, to the bearing member 30. Similar reference numerals have been used where the parts are similar to the parts already described in connection with FIGS. 1 and 2.

In the boot seal construction shown in FIG. 4, the annular open neck portion 75 of the boot seal 76 is directly bonded to a ring plug 77 that performs the same function as the ring 40, and there is no intermediate ring, such as the ring plug 72 of FIG. 3. The upper annular margin of the housing 11 is simply rolled in to form a flange 44 that overlies the ring plug 77 and exerts a loading pressure therethrough against the bearing member 30.

In the structure shown in FIG. 5, the sealing means comprises an annulus of rubber or other elastomeric material of considerable thickness, indicated by the reference numeral 80, to the lower surface 81 of which is bonded a ring seal 82. Like the plug ring 77, the ring 82 bears directly against the upper end surface of the bearing member 30 to exert a loading force upon such bearing member. The ring seal 80 is of such dimensions as to snugly receive a cylindrical portion 23 of the stud and to seal the same as at 83. The elastomeric character of the annular member 80 permits the relative tilting movement that may take place between the ball stud and the housing. The dotted lines 84, 85, extending upwardly from the annulus 80 serve merely to indicate the outline of an eye-member, like the eye 25, that bears directly against the annulus 80. The annulus 80 is in and of itself a sufficient seal for the assembly. The rolling in of the upper marginal portion of the socket housing 11 provides the same type of inturned annular flange 44, as previously described, and this flange in the construction shown in FIG. 5 bites into the annulus 80 as at 86, to securely engage said annulus and, at the same time, overlies and exerts pressure through the material of the annulus to the plug ring 82 and the bearing 30.

The application of a boot seal such as described to a centerlink, a pitman arm or idler arm socket, such as that hereinabove described, provides for permanent lubricant retention and the exclusion of foreign material, thereby increasing the efficiency and life of the assembly.

Owing to the particular construction of the reverse socket pivot joint of my invention, a lesser mass of housing material is required to envelop the ball end of the stud opposite the open end of the housing through which the shank of the stud protrudes. Referring to the structure illustrated in the drawings herein, this means that the closed end of the housing 11, indicated generally by the reference numeral 15, occupies less volume than does a housing of conventional design wherein the larger end of the housing is initially open for the insertion of the ball stud, and after such insertion, closed by a closure member retained in place by a turning in of the peripheral margin of the housing. In the joint assembly of my invention, the ball stud is inserted toward a fully closed end of the housing socket and it is the other end of the socket housing that is of larger diameter that provides the opening for the insertion of the ball end of the stud. The lesser space requirements of my joint assembly permits its use in areas heretofore not utilizable for heretofore conventional or common constructions of joint assemblies.

It will be understood that modifications and variations may be effected without departing from the scope of the novel concepts of the present invention.

I claim as my invention:

1. In a pivotal joint assembly including an open-ended socket housing, a ball stud with its ball end within said housing and with its shank end extending freely through the open end of said housing, and a bearing member between said ball end and inner socket wall, the improvement which comprises:
    said socket having a pair of frusto-conical surfaces including a first surface of lesser taper from said open end and a second surface of greater taper toward said closed end,
    a bearing member having similar frusto-conical surfaces and an opening centrally of said second surface,
    said ball end being hollow and open toward said closed end of said socket.

2. In a pivotal joint assembly including a cup-shaped socket housing having an open and a closed end, a ball stud with its ball end within said housing and with its shank extending freely through the open end thereof, and a generally cup-shaped bearing member between said ball and the inner socket side wall, the improvement which comprises:

said inner socket side wall having a surface converging toward the closed end of said housing, said bearing member being a one-piece annulus having a substantially spherical inner surface conforming generally with said ball end and an outer surface conforming generally with said inner socket side wall surface and with said closed housing end, said bearing member having an opening adjacent said closed housing end, said bearing member being formed of anti-frictional deformable plastic material adapted to be forced into press-fit relationship between said ball end and said inner wall surface and against said closed housing end, and means including a deformed portion of said housing around the open end thereof exerting a sufficient load on said bearing member to effect deformation thereof and to maintain said bearing member in said press-fit relationship, but leaving open said opening toward said closed housing end, said socket wall including a pair of substantially frusto-conical surfaces extending the length thereof and including a first surface of lesser taper extending from said open end and a second surface of greater taper extending to said closed end, and a substantially flat bottom surface substantially normal to the long axis of said socket and defining said closed end, said cup-shaped bearing member having complementary substantially frusto-conical outer peripheral surfaces in engagement with the frusto-conical surfaces of said socket wall and a substantially flat bottom wall engaging said flat bottom surface, said opening being located substantially centrally in said flat bottom wall.

References Cited

UNITED STATES PATENTS

| | | | |
|---|---|---|---|
| 2,461,866 | 2/1949 | Alldredge | 287—90 |
| 2,537,629 | 1/1951 | Brown | 287—90 |
| 3,086,801 | 4/1963 | Herbenar | 287—90 |
| 3,125,364 | 3/1964 | Springer | 287—90 |
| 3,147,537 | 9/1964 | Fadow | 287—90 X |
| 3,197,842 | 8/1965 | Parker | 287—90 X |
| 3,260,543 | 7/1966 | Henry-Biabaud | 287—87 |

FOREIGN PATENTS

| | | |
|---|---|---|
| 1,071,509 | 12/1959 | Germany. |
| 852,139 | 10/1960 | Great Britain. |

EDWARD C. ALLEN, *Primary Examiner.*

A. KUNDRAT, *Assistant Examiner.*